United States Patent
Toksvig et al.

(10) Patent No.: US 8,780,128 B2
(45) Date of Patent: Jul. 15, 2014

(54) CONTIGUOUSLY PACKED DATA

(75) Inventors: Michael J. M. Toksvig, Palo Alto, CA (US); Justin Michael Mahan, Fremont, CA (US); Christopher L. Mills, Saratoga, CA (US)

(73) Assignee: Nvidia Corporation, Santa Clara, CA (US)

( * ) Notice: Subject to any disclaimer, the term of this patent is extended or adjusted under 35 U.S.C. 154(b) by 1143 days.

(21) Appl. No.: 12/002,641

(22) Filed: Dec. 17, 2007

(65) Prior Publication Data

US 2009/0157963 A1    Jun. 18, 2009

(51) Int. Cl.
*G09G 5/36* (2006.01)
*G06F 12/00* (2006.01)

(52) U.S. Cl.
USPC .......................................... 345/557; 711/118

(58) Field of Classification Search
USPC ......................................................... 345/503
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,682,664 A | 7/1987 | Kemp |
| 4,685,071 A | 8/1987 | Lee |
| 4,739,495 A | 4/1988 | Levine |
| 4,771,470 A | 9/1988 | Geiser et al. |
| 4,866,524 A * | 9/1989 | Six .................................. 348/596 |
| 4,920,428 A | 4/1990 | Lin et al. |
| 4,987,496 A | 1/1991 | Greivenkamp, Jr. |
| 5,060,227 A * | 10/1991 | Finley et al. .................... 370/466 |
| 5,175,430 A | 12/1992 | Enke et al. |
| 5,227,789 A | 7/1993 | Barry et al. |
| 5,261,029 A | 11/1993 | Abi-Ezzi et al. |
| 5,305,994 A | 4/1994 | Matsui et al. |
| 5,338,901 A | 8/1994 | Dietrich |
| 5,387,983 A | 2/1995 | Sugiura et al. |
| 5,475,430 A | 12/1995 | Hamada et al. |
| 5,513,016 A | 4/1996 | Inoue |
| 5,608,824 A | 3/1997 | Shimizu et al. |
| 5,652,621 A | 7/1997 | Adams, Jr. et al. |
| 5,793,433 A | 8/1998 | Kim et al. |
| 5,822,452 A | 10/1998 | Tarolli et al. |
| 5,831,625 A | 11/1998 | Rich et al. |
| 5,878,174 A | 3/1999 | Stewart et al. |
| 5,892,517 A | 4/1999 | Rich |
| 5,903,273 A | 5/1999 | Mochizuki et al. |
| 5,995,109 A | 11/1999 | Goel et al. |

(Continued)

FOREIGN PATENT DOCUMENTS

| | | | |
|---|---|---|---|
| JP | 2000516752 A | 12/2000 | |
| JP | 2008113416 A2 | 5/2008 | |

*Primary Examiner* — Kee M Tung
*Assistant Examiner* — Sing-Wai Wu (57) ABSTRACT

Data for data elements (e.g., pixels) can be stored in an addressable storage unit that can store a number of bits that is not a whole number multiple of the number of bits of data per data element. Similarly, a number of the data elements can be transferred per unit of time over a bus, where the width of the bus is not a whole number multiple of the number of bits of data per data element. Data for none of the data elements is stored in more than one of the storage units or transferred in more than one unit of time. Also, data for multiple data elements is packaged contiguously in the storage unit or across the width of the bus.

5 Claims, 3 Drawing Sheets

(56) References Cited

U.S. PATENT DOCUMENTS

| | | | |
|---|---|---|---|
| 6,016,474 A | 1/2000 | Kim et al. |
| 6,078,331 A | 6/2000 | Pulli et al. |
| 6,118,547 A | 9/2000 | Tanioka |
| 6,128,000 A | 10/2000 | Jouppi et al. |
| 6,141,740 A | 10/2000 | Mahalingaiah et al. |
| 6,151,457 A | 11/2000 | Kawamoto |
| 6,175,430 B1 | 1/2001 | Ito |
| 6,236,405 B1 | 5/2001 | Schilling et al. |
| 6,252,611 B1 | 6/2001 | Kondo |
| 6,281,931 B1 | 8/2001 | Tsao et al. |
| 6,289,103 B1 | 9/2001 | Sako et al. |
| 6,298,169 B1 | 10/2001 | Guenter |
| 6,314,493 B1 | 11/2001 | Luick |
| 6,319,682 B1 | 11/2001 | Hochman |
| 6,323,934 B1 | 11/2001 | Enomoto |
| 6,339,428 B1 | 1/2002 | Fowler et al. |
| 6,392,216 B1 | 5/2002 | Peng-Tan |
| 6,396,397 B1 | 5/2002 | Bos et al. |
| 6,438,664 B1 | 8/2002 | McGrath et al. |
| 6,469,707 B1 | 10/2002 | Voorhies |
| 6,486,971 B1 | 11/2002 | Kawamoto |
| 6,504,952 B1 | 1/2003 | Takemura et al. |
| 6,556,311 B1 | 4/2003 | Benear et al. |
| 6,584,202 B1 | 6/2003 | Montag et al. |
| 6,594,388 B1 | 7/2003 | Gindele et al. |
| 6,683,643 B1 | 1/2004 | Takayama et al. |
| 6,707,452 B1 | 3/2004 | Veach |
| 6,724,932 B1 | 4/2004 | Ito |
| 6,737,625 B2 | 5/2004 | Baharav et al. |
| 6,760,080 B1 | 7/2004 | Moddel et al. |
| 6,785,814 B1 | 8/2004 | Usami et al. |
| 6,806,452 B2 | 10/2004 | Bos et al. |
| 6,819,793 B1 | 11/2004 | Reshetov et al. |
| 6,839,062 B2 | 1/2005 | Aronson et al. |
| 6,856,441 B2 | 2/2005 | Zhang et al. |
| 6,891,543 B2 | 5/2005 | Wyatt |
| 6,900,836 B2 | 5/2005 | Hamilton, Jr. |
| 6,940,511 B2 | 9/2005 | Akenine-Moller et al. |
| 6,950,099 B2 | 9/2005 | Stollnitz et al. |
| 7,009,639 B1 | 3/2006 | Une et al. |
| 7,015,909 B1 | 3/2006 | Morgan, III et al. |
| 7,023,479 B2 | 4/2006 | Hiramatsu et al. |
| 7,081,898 B2 | 7/2006 | Sevigny |
| 7,088,388 B2 | 8/2006 | MacLean et al. |
| 7,092,018 B1 | 8/2006 | Watanabe |
| 7,106,368 B2 | 9/2006 | Daiku et al. |
| 7,116,335 B2 | 10/2006 | Pearce et al. |
| 7,133,072 B2 | 11/2006 | Harada |
| 7,146,041 B2 | 12/2006 | Takahashi |
| 7,221,779 B2 | 5/2007 | Kawakami et al. |
| 7,227,586 B2 | 6/2007 | Finlayson et al. |
| 7,236,649 B2 | 6/2007 | Fenney |
| 7,245,319 B1 | 7/2007 | Enomoto |
| 7,305,148 B2 | 12/2007 | Spampinato et al. |
| 7,343,040 B2 | 3/2008 | Chanas et al. |
| 7,397,946 B2 | 7/2008 | Reshetov et al. |
| 7,486,844 B2 | 2/2009 | Chang et al. |
| 7,502,505 B2 | 3/2009 | Malvar et al. |
| 7,580,070 B2 | 8/2009 | Yanof et al. |
| 7,627,193 B2 | 12/2009 | Alon et al. |
| 7,671,910 B2 | 3/2010 | Lee |
| 7,728,880 B2 | 6/2010 | Hung et al. |
| 7,750,956 B2 | 7/2010 | Wloka |
| 7,760,936 B1 | 7/2010 | King et al. |
| 7,912,279 B2 | 3/2011 | Hsu et al. |
| 8,049,789 B2 | 11/2011 | Innocent |
| 8,238,695 B1 | 8/2012 | Davey et al. |
| 8,594,441 B1 | 11/2013 | King et al. |
| 2001/0001234 A1 | 5/2001 | Addy et al. |
| 2001/0012113 A1 | 8/2001 | Yoshizawa et al. |
| 2001/0012127 A1 | 8/2001 | Fukuda et al. |
| 2001/0015821 A1 | 8/2001 | Namizuka et al. |
| 2001/0019429 A1 | 9/2001 | Oteki et al. |
| 2001/0021278 A1 | 9/2001 | Fukuda et al. |
| 2001/0033410 A1 | 10/2001 | Helsel et al. |
| 2001/0050778 A1 | 12/2001 | Fukuda et al. |
| 2001/0054126 A1 | 12/2001 | Fukuda et al. |
| 2002/0012131 A1 | 1/2002 | Oteki et al. |
| 2002/0015111 A1 | 2/2002 | Harada |
| 2002/0018244 A1 | 2/2002 | Namizuka et al. |
| 2002/0027670 A1 | 3/2002 | Takahashi et al. |
| 2002/0033887 A1 | 3/2002 | Hieda et al. |
| 2002/0041383 A1 | 4/2002 | Lewis, Jr. et al. |
| 2002/0044778 A1 | 4/2002 | Suzuki |
| 2002/0054374 A1 | 5/2002 | Inoue et al. |
| 2002/0063802 A1 | 5/2002 | Gullichsen et al. |
| 2002/0105579 A1 | 8/2002 | Levine et al. |
| 2002/0126210 A1 | 9/2002 | Shinohara et al. |
| 2002/0146136 A1 | 10/2002 | Carter, Jr. |
| 2002/0149683 A1 | 10/2002 | Post |
| 2002/0158971 A1 | 10/2002 | Daiku et al. |
| 2002/0167202 A1 | 11/2002 | Pfalzgraf |
| 2002/0167602 A1 | 11/2002 | Nguyen |
| 2002/0191694 A1 | 12/2002 | Ohyama et al. |
| 2002/0196470 A1 | 12/2002 | Kawamoto et al. |
| 2003/0035100 A1 | 2/2003 | Dimsdale et al. |
| 2003/0067461 A1 | 4/2003 | Fletcher et al. |
| 2003/0122825 A1 | 7/2003 | Kawamoto |
| 2003/0142222 A1 | 7/2003 | Hordley |
| 2003/0146975 A1 | 8/2003 | Joung et al. |
| 2003/0169353 A1 | 9/2003 | Keshet et al. |
| 2003/0169918 A1 | 9/2003 | Sogawa |
| 2003/0197701 A1 | 10/2003 | Teodosiadis et al. |
| 2003/0222995 A1 | 12/2003 | Kaplinsky et al. |
| 2003/0223007 A1 | 12/2003 | Takane |
| 2004/0001061 A1 | 1/2004 | Stollnitz et al. |
| 2004/0001234 A1 | 1/2004 | Curry et al. |
| 2004/0032516 A1 | 2/2004 | Kakarala |
| 2004/0051716 A1 | 3/2004 | Sevigny |
| 2004/0066970 A1 | 4/2004 | Matsugu |
| 2004/0085321 A1* | 5/2004 | Oka et al. ............ 345/501 |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0151372 A1 | 8/2004 | Reshetov et al. |
| 2004/0189875 A1 | 9/2004 | Zhai et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0027944 A1* | 2/2005 | Williams et al. ............ 711/137 |
| 2005/0030395 A1 | 2/2005 | Hattori |
| 2005/0046704 A1 | 3/2005 | Kinoshita |
| 2005/0073591 A1 | 4/2005 | Ishiga et al. |
| 2005/0099418 A1 | 5/2005 | Cabral et al. |
| 2005/0111110 A1 | 5/2005 | Matama |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0286097 A1 | 12/2005 | Hung et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0133697 A1 | 6/2006 | Uvarov et al. |
| 2006/0153441 A1 | 7/2006 | Li |
| 2006/0176375 A1 | 8/2006 | Hwang et al. |
| 2006/0197664 A1 | 9/2006 | Zhang et al. |
| 2006/0236076 A1* | 10/2006 | Peleg et al. ............ 712/24 |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0091188 A1 | 4/2007 | Chen et al. |
| 2007/0147706 A1 | 6/2007 | Sasaki et al. |
| 2007/0171288 A1 | 7/2007 | Inoue et al. |
| 2007/0236770 A1 | 10/2007 | Doherty et al. |
| 2007/0247532 A1 | 10/2007 | Sasaki |
| 2007/0262985 A1 | 11/2007 | Watanabe et al. |
| 2007/0285530 A1 | 12/2007 | Kim et al. |

(56) References Cited

U.S. PATENT DOCUMENTS

| | | |
|---|---|---|
| 2008/0030587 A1 | 2/2008 | Helbing |
| 2008/0043024 A1 | 2/2008 | Schiwietz et al. |
| 2008/0062164 A1 | 3/2008 | Bassi et al. |
| 2008/0101690 A1 | 5/2008 | Hsu et al. |
| 2008/0143844 A1 | 6/2008 | Innocent |
| 2009/0010539 A1 | 1/2009 | Guarnera et al. |
| 2009/0037774 A1 | 2/2009 | Rideout et al. |
| 2009/0116750 A1 | 5/2009 | Lee et al. |
| 2009/0128575 A1 | 5/2009 | Liao et al. |
| 2009/0160957 A1 | 6/2009 | Deng et al. |
| 2009/0257677 A1 | 10/2009 | Cabral et al. |
| 2009/0297022 A1 | 12/2009 | Pettigrew et al. |
| 2010/0266201 A1 | 10/2010 | Cabral et al. |

\* cited by examiner

CONTIGUOUSLY PACKED DATA

FIELD

Embodiments of the present invention generally relate to the transfer and storage of data.

BACKGROUND

In computer science, caches are used to reduce the number of accesses to main memory and to reduce the latency associated with data retrieval. Essentially, a cache is smaller and faster than main memory and can be used to store copies of frequently accessed data.

In computer graphics, a cache can be situated between a framebuffer and a graphics pipeline (e.g., a rasterizer). The cache allows the rasterizer to access pixel data at higher speed, assuming the needed pixel data is in the cache.

Typically, 24 bits (three bytes) of data are associated with each pixel—for example, 24 bits of color data (e.g., three eight-bit color values, one value for red, one for green and one for blue) may be associated with a pixel. Each cache line is typically 256 bits (32 bytes) in length. Because 256 is not a whole number multiple of 24 (256/24=10⅔), storing 24-bit pixels in a cache can be problematic.

For example, all of the data for ten 24-bit pixels and two-thirds of the data for an eleventh 24-bit pixel can be stored in one cache line, with the remainder of the data for the eleventh pixel stored in a second cache line. However, this can be problematic because two memory accesses instead of one are required in order to read the data for the eleventh pixel.

Alternatively, a 24-bit pixel can be stored every 32 bits (four bytes). That is, eight empty bit locations separate each 24-bit pixel from the next. Consequently, each 256-bit cache line contains data for only eight 24-bit pixels. This avoids the problem described above, but as a result 25 percent of the space available in a cache line is unused.

SUMMARY

Accordingly, there is a need to more efficiently store data in a cache, to reduce the amount of unused space without requiring multiple memory accesses to read some of the data. Embodiments according to the present invention provide these and other advantages.

In one embodiment, data for multiple discrete data elements (e.g., pixels, texels, depth values, etc.) can be stored contiguously in a cache line, where the length of the cache line in bits is not a whole number multiple of the number of bits of data per data element, such that none of the data elements is stored in more than one of the cache lines—that is, no data element is stored partially in one cache line and partially in another cache line.

For example, five 24-bit data elements can be stored every 16 bytes—data for the five data elements is stored contiguously over the first 15 bytes, and the next byte is unused. In a 256-bit cache line, the next 15 bytes hold data for another five data elements, with the remaining byte unused. Thus, for example, instead of storing data for only eight 24-bit pixels in a 256-bit cache line, data for ten such pixels can be stored, representing a 25 percent increase in the number of pixels that can be fit into the same memory footprint.

In another embodiment, in a manner similar to the above, data for multiple discrete data elements can be stored contiguously in a memory that includes a number of "addressable storage units," where the length of a storage unit in bits is not a whole number multiple of the number of bits of data per data element, such that data for none of the data elements is stored in more than one of the addressable storage units—that is, no data element is stored partially in one storage unit and partially in another storage unit.

In yet another embodiment, in a manner analogous to that just described, a number of the data elements can be transferred per unit of time (e.g., per clock tick or pulse) over a bus, where the width of the bus in bits is not a whole number multiple of the number of bits of data per data element, such that data for a subset of the data elements is packaged contiguously across the width of the bus and such that data for none of the data elements is transferred in more than one clock tick—that is, no data element is transferred partially at one clock tick and partially at a subsequent clock tick.

In general, embodiments according to the present invention make more efficient use of available memory or cache space without any of the data elements straddling more than one addressable storage unit or cache line. Embodiments according to the present invention also make more efficient use of available bus width without any of the data elements straddling more than unit of time.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "storing" or "retrieving" or "dividing" or "multiplying" or "adding" or "using" or "packaging" or "transferring" or the like, refer to the actions and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions or components residing on some form of computer-usable medium, such as program modules, executed by one or more computers or other devices. Generally, program modules include routines, programs, objects, data structures, etc., that perform particular tasks or implement particular abstract data types. The functionality of the program modules may be combined or distributed as desired in various embodiments.

By way of example, and not limitation, computer-usable media may comprise computer storage media and communication media and combinations thereof. Computer storage media includes volatile and nonvolatile, removable and non-removable media implemented in any method or technology for storage of information such as computer-readable instructions, data structures, program modules or other data. Communication media can embody computer-readable instructions, data structures, program modules or other data in a modulated data signal such as a carrier wave or other transport mechanism and includes any information delivery media.

Embodiments herein are described in the context of a computer graphics system that includes a memory and a cache for storing graphics data, and a bus for transporting graphics data; however, the present invention is not so limited. Embodiments according to the present invention are well-suited for use with other types of data and other types of applications. Also, embodiments of the present invention can be implemented on computer systems and graphics processor units (GPUs) that are different in form or function from those described in conjunction with FIGS. 1 and 2.

Figure 1:
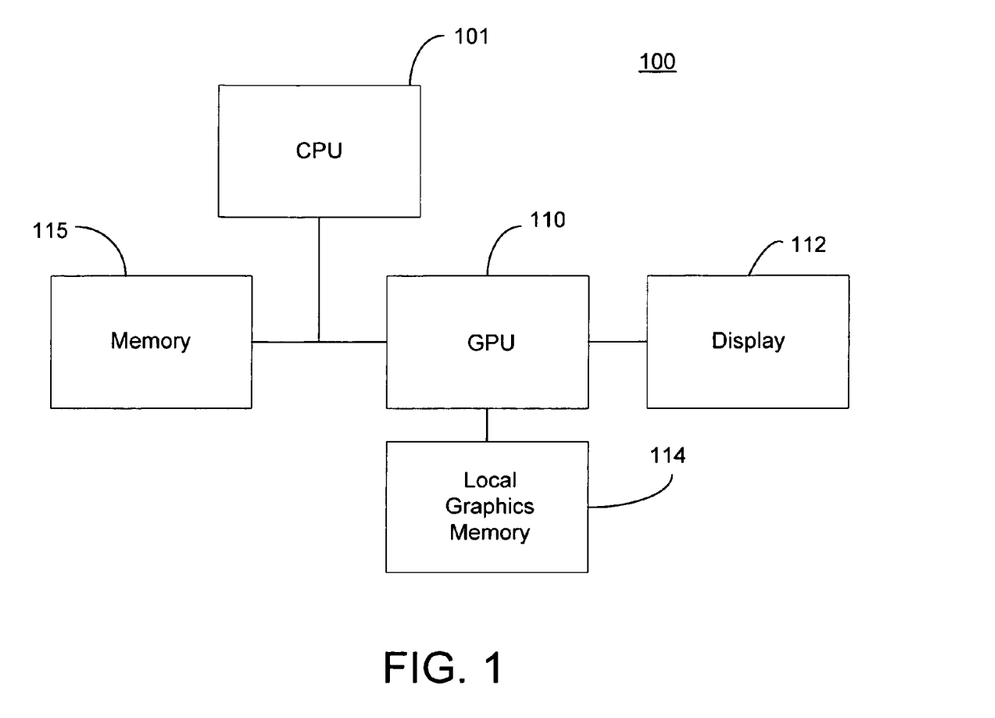
FIG. 1 is a block diagram showing components of a computer system in accordance with one embodiment of the present invention.

FIG. 1 shows a computer system 100 in accordance with one embodiment of the present invention. The computer system includes the components of a basic computer system in accordance with embodiments of the present invention, providing the execution platform for certain hardware-based and software-based functionality. In general, the computer system comprises at least one central processing unit (CPU) 101, a system memory 115, and at least one GPU 110.

The CPU can be coupled to the system memory via a bridge component/memory controller (not shown) or can be directly coupled to the system memory via a memory controller (not shown) internal to the CPU. The GPU is coupled to a display 112. One or more additional GPUs can optionally be coupled to system 100 to further increase its computational power. The GPU(s) is/are coupled to the CPU and the system memory.

The computer system can be implemented as, for example, a desktop computer system or server computer system, having a powerful general-purpose CPU coupled to a dedicated graphics rendering GPU. In such an embodiment, components can be included that add peripheral buses, specialized graphics memory, input/output (I/O) devices, and the like. Similarly, the computer system can be implemented as a handheld device (e.g., a cell phone, etc.) or a set-top video game console device.

The GPU can be implemented as a discrete component, a discrete graphics card designed to couple to the computer system via a connector (e.g., an Accelerated Graphics Port slot, a Peripheral Component Interconnect-Express slot, etc.), a discrete integrated circuit die (e.g., mounted directly on a motherboard), or an integrated GPU included within the integrated circuit die of a computer system chipset component (not shown) or within the integrated circuit die of a PSOC (programmable system-on-a-chip). Additionally, a local graphics memory 114 can be included for the GPU for high bandwidth graphics data storage.

Figure 2:
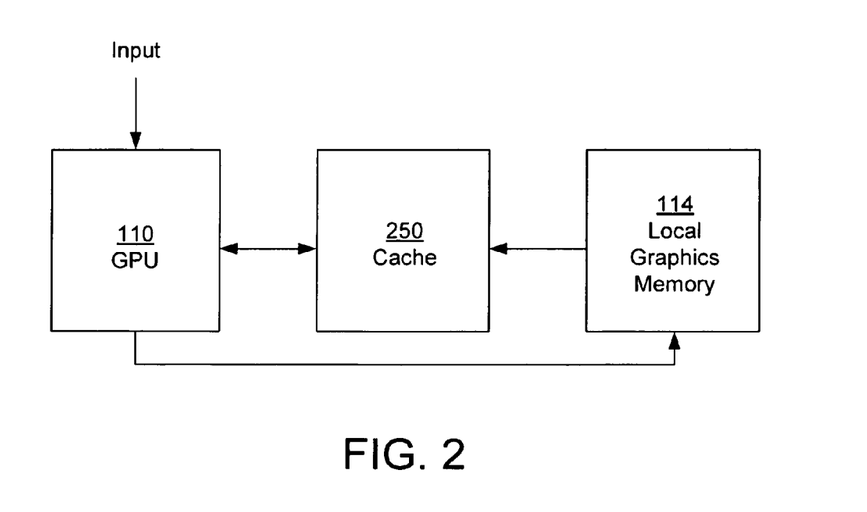
FIG. 2 is a block diagram showing elements of a computer graphics system according to one embodiment of the present invention.

FIG. 2 is a block diagram illustrating a GPU 110, a graphics memory 114 and a cache 250 in accordance with one embodiment of the present invention. In the FIG. 2 embodiment, graphics data (e.g., primitives, triangle strips, etc.), pipeline configuration information (e.g., mode settings, rendering profiles, etc.), and rendering programs (e.g., pixel shader programs, vertex shader programs, etc.) are input to the GPU from an upstream functional module (e.g., from an upstream raster module, from a setup module, or from the graphics driver).

The cache 250 functions as a high-speed cache for the information stored in the graphics memory (e.g., frame buffer memory). Generally speaking, data in the cache is accessible to the GPU; data needed by the GPU that is not in the cache can be retrieved from the memory and written to the cache; and data acted on by the GPU can also be written back to the cache by the GPU. Details regarding the role of the cache and how it performs its functions in conjunction with the GPU and the graphics memory are known in the art.

In a computer graphics embodiment, the data stored in the cache can include, for example, pixel data, texel data, depth values, spatial coordinates, fog values, and/or other quantities and attributes associated with rendering a pixel on a display. In general, the term "data element" is used herein to refer to a unit or instance of data—in general, a data element is a unit of data consisting of multiple bits. In a computer graphics embodiment, a data element may represent a pixel, a texel, or a quantity or attribute associated with a pixel or texel. For example, in a computer graphics embodiment, a data element can include an eight-bit red color value, an eight-bit blue color value and an eight-bit green color value—these three eight-bit values constitute a data element. For ease and clarity of discussion, the description below uses pixel data as an example embodiment representative of and extendable to other types of data elements.

Figure 3:
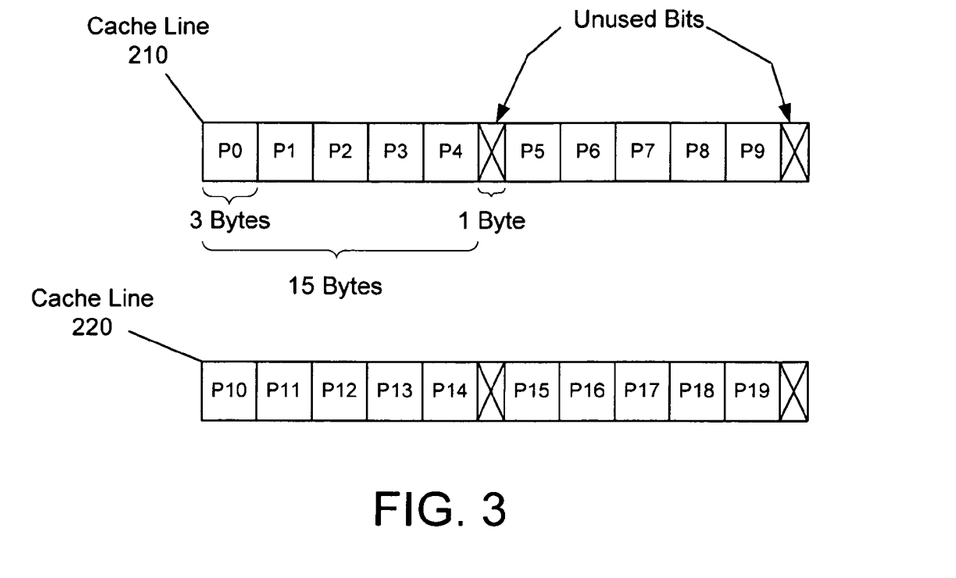
FIG. 3 illustrates pixel data stored in a cache according to one embodiment of the present invention.

FIG. 3 illustrates pixel data stored in a cache 250 according to one embodiment of the present invention. In the example of FIG. 3, 24 bits (three bytes) of data are associated with each pixel P0, P1, . . . , P18 and P19, and each of the cache lines 210 and 220 holds 256 bits (32 bytes) of data. However, embodiments according to the invention are not so limited; there may be more bits per data element, and/or more bits per cache line. Also, only two cache lines are illustrated; however, the cache can contain more than two cache lines.

In FIG. 3, data for the first five discrete data elements (e.g., pixels P0-P4) are contiguously stored in the first 15 bytes of the first cache line 210. That is, there are no empty bits between the pixels P0-P4. Eight unused bits follow the data for the first set of five pixels, separating that data from the data for the next set of five pixels P5-P9. Eight unused bits follow the data for the second set of pixels. In a similar fashion, data for the pixels P10-P14 are contiguously stored in the first 15 bytes of the second cache line 220, followed by eight unused bits, which are followed by data for the pixels P15-P19 in the next 15 contiguous bytes, which in turn are followed by the remaining eight unused bits. Thus, instead of storing data for only eight 24-bit pixels in a 256-bit cache line, data for ten such pixels can be stored, representing a 25 percent increase in the number of data elements that can be fit into the same memory footprint.

In general, for a given set of discrete data elements, in instances in which each data element includes a first number of bits but each cache line can store a second number of bits that is not a whole number multiplier of the first number of bits, the data for some number of the discrete data elements is stored per cache line, subject to the following conditions: 1) data for none of the data elements is stored in more than one of the cache lines—that is, no data element is stored partially in one cache line and partially in another cache line; and 2) multiple data elements (e.g., N data elements, with N greater than one) are contiguously stored in a cache line. As a result, any unused bits are grouped contiguously with those N data elements. The unused bits in a cache line may either precede or follow the N data elements.

In the example of FIG. 3, N is five. Alternatively, N could be ten—for example, the ten pixels P0-P9 could be stored contiguously in a cache line, followed by two bytes of unused space.

The examples above can be readily extended to cache lines that are greater than 256 bits in length. For instance, 21 24-bit values can be stored every 64 bytes in a larger cache line, representing a 31 percent increase in the number of data elements that can be fit into the same memory footprint. Also, for instance, 85 24-bit values can be stored every 256 bytes in a larger cache line, representing a 33 percent increase in the number of data elements that can be fit into the same memory footprint.

Data for a selected pixel can be retrieved by applying a formula to map a number associated with the selected pixel to the location of the pixel in the cache. In one FIG. 3 embodiment, the following formula is applied:

$$\text{location}(P) = \lfloor P/N \rfloor * M + (P\%N) * R; \quad (1)$$

where "location(P)" is the location in the cache of pixel P and "P" is the pixel number, where the location is measured in bytes from the beginning of the cache; "N" is the number of pixels contiguously stored; "$\lfloor P/N \rfloor$" is the mathematical floor of the quantity P/N; "M" is the number of bytes encompassing the N pixels and the unused bits following (or preceding) those N pixels; "P % N" refers to P modulo N (which is the remainder of P/N); and "R" is the number of bytes per pixel.

In FIG. 3, P is zero for pixel P0, one for pixel P1, etc.; N is five; M is 16; and R is three. To locate pixel P17 using equation (1), for example, location(P) would equal 54. Counting 54 bytes from the beginning of the cache, one arrives at the location of pixel P17.

In general, the floor can be used to identify which cache line holds data for the selected pixel, and the modulus or remainder can be used to determine the location of that data within the identified cache line. Note that the value of the floor does not necessarily identify (equate to) the number of the cache line, as shown by the example calculation above in which the floor is three but the selected pixel is in the second cache line.

Figure 4:
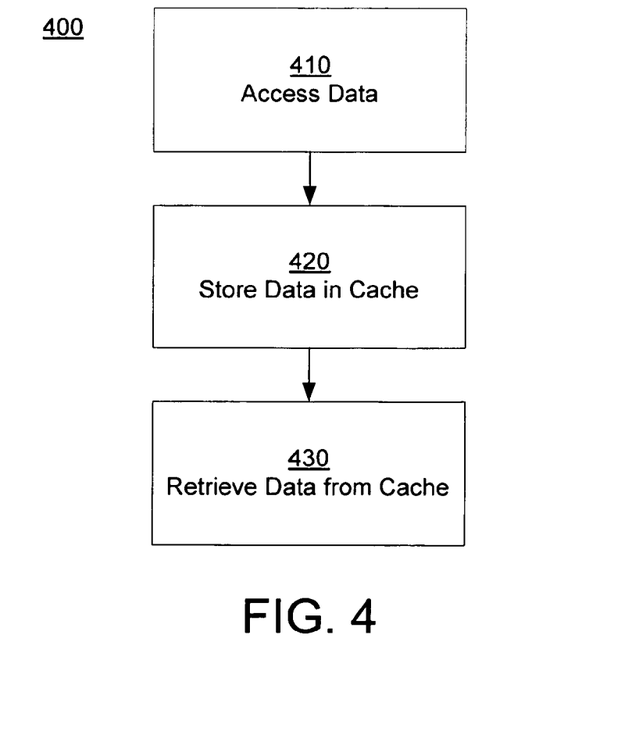
FIG. 4 is a flowchart of a computer-implemented method for packaging data in a cache according to one embodiment of the present invention.

FIG. 4 is a flowchart 400 of an example of a computer-implemented method for packaging data according to one embodiment of the present invention. In block 410, data for some number T of discrete data elements (e.g., pixels) is accessed.

In block 420, the data is stored in the cache. More specifically, in one embodiment, data for multiple data elements (e.g., N data elements, where N is less than or equal to T) is stored contiguously in a cache line. As a result, any unused bits in the cache line are contiguously grouped with (e.g., following or preceding) the data for the N data elements. Also, data for none of the N data elements is stored in more than one of the cache lines—that is, no data element is stored partially in one cache line and partially in another cache line.

In another embodiment, data for each successive data element of the set of T data elements is stored in a cache line contiguous with data for the preceding data element until the cache line is filled or nearly filled. Consequently, in this embodiment, all data in a cache line is contiguously grouped, and all unused bits in the cache line are also contiguously grouped. The unused bits may either precede or follow the data. Here, "nearly filled" means that the cache line is filled to an amount such that none of the data elements is partially stored in the cache line—that is, the cache line is filled until there is not enough space left in the cache line to entirely store a data element, in which case that data element is stored in another cache line.

In block 430, data can be retrieved from the cache. In one embodiment, a number associated with the data element (e.g., a pixel number) is used to identify the location of a particular data element in the cache, as previously described herein.

In general, data for discrete data elements can be stored contiguously in a memory that includes a number of "addressable storage units," such that data for none of the data elements is stored in more than one of the addressable storage units—that is, no data element is stored partially in one storage unit and partially in another storage unit.

Figure 5:
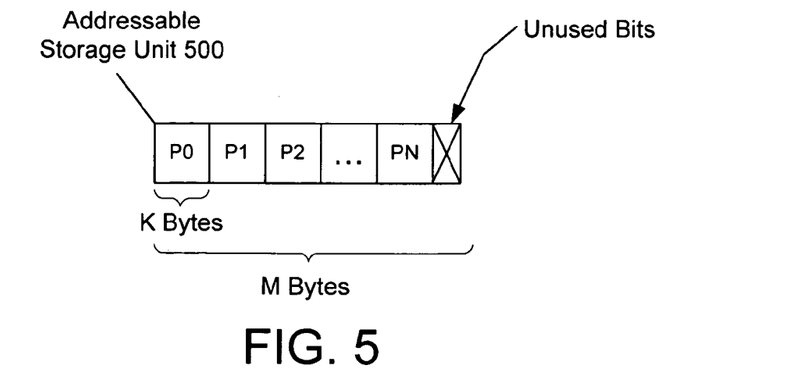
FIG. 5 illustrates an addressable storage unit according to one embodiment of the present invention.

An addressable storage unit is sometimes referred to as the size of the address space on a computer system. FIG. 5 illustrates an example of an addressable storage unit 500. As used herein, an addressable storage unit includes M contiguous bytes, where M has the same meaning as above. In general, M is a multiple of two. In general, N K-byte data elements are contiguously stored every M bytes in a memory, where K and N are whole numbers (N has the same meaning as above), where K*N is less than M and where M is not a whole number multiplier of K.

Figure 6:
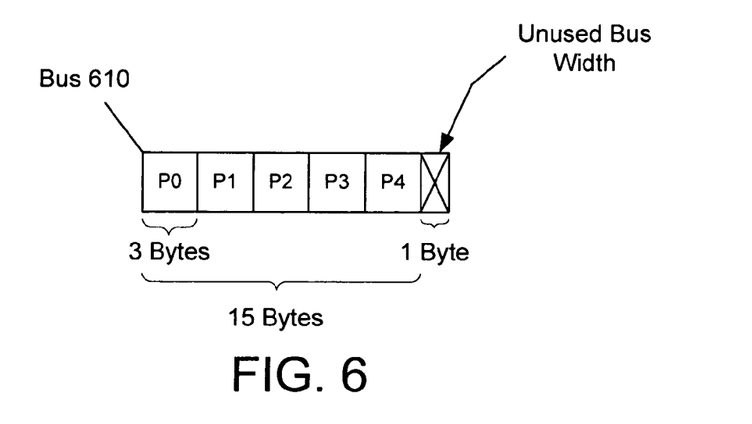
FIG. 6 illustrates pixel data in a bus according to another embodiment of the present invention.

FIG. 6 illustrates pixel data in a bus 610 at a moment in time according to one embodiment of the present invention. In essence, the bus is shown in cross-section at a moment in time. In general, the bus carries data between a memory (e.g., memory 115 of FIG. 1), a data processor (e.g., CPU 101 or GPU 110 of FIG. 1) and/or a cache (e.g., cache 250 of FIG. 1), or perhaps between a memory and a memory controller.

In the example of FIG. 6, 24 bits (three bytes) of data are associated with each pixel P0, P1, . . . , and P4, and the bus has a width of 128 bits (16 bytes). However, embodiments according to the invention are not so limited; there may be more bits per data element, and/or the bus may have a different width. The bus can carry an amount of data per "unit of time"—the amount of data may be less than the width of the bus, and a unit of time may be less than one second. More specifically, a "unit of time" depends on the clock frequency associated with the bus and the number of data transfers that can occur per clock pulse or tick. For example, there may be 100 clock ticks per second and four data transfers per clock tick, in which case a unit of time would be ¹⁄₄₀₀th of a second.

In FIG. 6, data for the first five discrete data elements (e.g., pixels P0-P4) is contiguously packaged in the 15 bytes of bus width. That is, there are no empty bits between the pixels P0-P4, and eight bits of unused bus width "follow" the data for the set of pixels (in this context, "follow" does not mean that the unused bus width follows the data in time, but follows the data in the left-to-right orientation of FIG. 6; "preceding" may be similarly interpreted).

In general, for a given set of discrete data elements, in instances in which each data element includes a first number of bits but a bus can transfer a second number of bits per unit of time, where the second number of bits is not a whole number multiplier of the first number of bits, the data for some number of the discrete data elements can be transferred per unit of time, subject to the following conditions: 1) data for none of the data elements is transferred in more than one of the units of time—that is, no data element is transferred partially in over one unit of time and partially over a subsequent unit of time; and 2) multiple data elements (e.g., N data elements, with N greater than one) are contiguously packaged across the width of the bus. As a result, any unused bus width is grouped contiguously with those N data elements.

In the example of FIG. 6, N is five. Depending on the width of the bus, N can be different than five. For example, if the bus width is 32 bytes, then ten pixels can be transferred per unit of time. The data for those ten pixels could be packaged contiguously across the width of the bus, followed by two bytes of unused bus width. There are other ways to package the ten pixels across the width of the bus. For example, data for a first set of five pixels could be packaged as shown in FIG. 6, with one byte of unused bus width separating the first set from data for a second set five pixels, with another one byte of unused bus width following the second set of pixels. Alternatively, data for all ten pixels can be contiguously packaged following one byte of unused bus width, and another byte of unused bus width could follow the data for the ten pixels.

The examples above can be readily extended to bus widths that are greater than 128 or 256 bits in length. For instance, 21 24-bit values can be packaged every 64 bytes in a wider bus, or 85 24-bit values can be stored every 256 bytes in an even wider bus.

Figure 7:
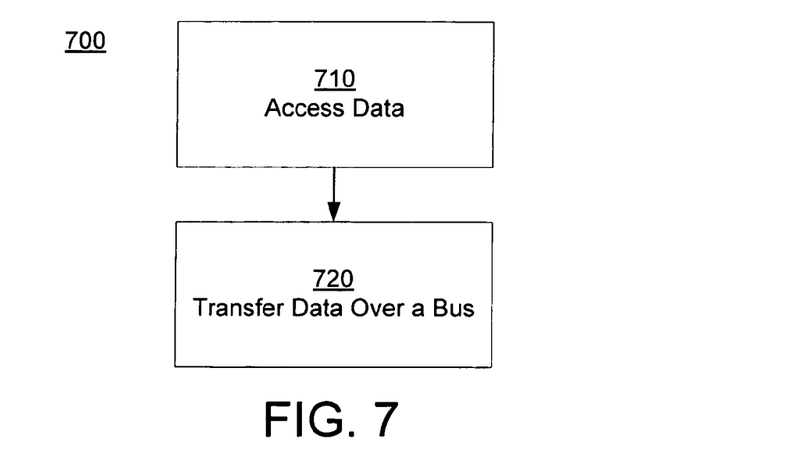
FIG. 7 is a flowchart of a computer-implemented method for packaging data across a bus according to one embodiment of the present invention.

FIG. 7 is a flowchart 700 of a computer-implemented method for packaging data across the width of a bus according to one embodiment of the present invention. In block 710, data for some number T of discrete data elements (e.g., pixels) is accessed in memory.

In block 720, the data is transported over a bus over a unit of time. More specifically, in one embodiment, data for multiple data elements (e.g., N data elements, where N is less than or equal to T) is packaged contiguously across the width of the bus. Also, data for none of the N data elements is transferred in more than unit of time—that is, no data element is transferred partially during one unit of time and partially during another unit of time.

Although specific steps are disclosed in the flowcharts 400 and 700, such steps are exemplary. That is, embodiments of the present invention are well-suited to performing various other steps or variations of the steps recited in the flowcharts. The steps in the flowcharts may be performed in an order different than presented.

In summary, embodiments according to the present invention permit data to be more efficiently stored in a memory or cache, reducing the amount of unused space in the memory or cache without requiring multiple memory accesses to read some of the data. In a similar fashion, embodiments according to the present invention also make more efficient use of available bus width.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method of managing data, said method comprising:
    accessing data for a plurality of discrete data elements, wherein each of said data elements comprises a first number of bits of data; and
    storing said data in a memory comprising a plurality of addressable storage units including a first storage unit with a capacity of at least 64 bytes, wherein 21 24-bit data elements are stored contiguously in said first storage unit.

2. The method of claim 1 wherein said first storage unit has a capacity of at least 256 bytes, wherein 85 24-bit data elements are stored contiguously in said first storage unit.

3. A computer-implemented method of managing data, said method comprising:
    accessing data for a plurality of discrete data elements, wherein each of said data elements comprises a first number of bits of data; and
    storing said data in a cache comprising a plurality of cache lines, each of said cache lines capable of storing a second number of bits that is not a whole number multiple of said first number of bits, wherein data for none of said data elements is stored in more than one of said cache lines, wherein data for multiple data elements is stored contiguously in a cache line, and wherein said second number of bits comprises 256 bits, wherein a first set of five 24-bit data elements is stored contiguously in a cache line of said plurality of cache lines and a second set of five 24-bit data elements is also stored contiguously in said cache line, said first set and said second set separated by a contiguous block of eight unused bits.

4. The method of claim 3 further comprising retrieving data for a selected data element from said cache by computing a location for said selected data element, said location computed by: i) dividing a number associated with said selected data element by the maximum number of data elements that can be stored contiguously in a segment of bits to determine a floor and a remainder, ii) multiplying said floor by the number of bytes in said segment to determine a first result, iii) multiplying said remainder by the number of bytes per data element to determine a second result, and iv) adding said first and second results.

5. A computer-implemented method of managing data, said method comprising:

accessing data for a plurality of discrete data elements, wherein each of said data elements comprises a first number of bits of data; and     transferring a number of said data elements, comprising not more that said first number of bits, per unit of time over a bus, wherein said bus is capable of transferring a second number of bits per said unit of time, wherein said second number is not a whole number multiple of said first number of bits, wherein data for none of said data elements is transferred in more than one said unit of time, and wherein said second number of bits comprises 256 bits, wherein a first set of five 24-bit data elements is packaged contiguously in said bus during a first unit of time and a second set of five 24-bit data elements is also packaged contiguously in said bus during said first unit of time, said first set and said second set separated by a contiguous block of eight unused bits.

* * * * *